Feb. 13, 1951 M. L. JURASEVICH 2,541,364
VEHICLE BUMPER
Filed June 14, 1948 2 Sheets-Sheet 1
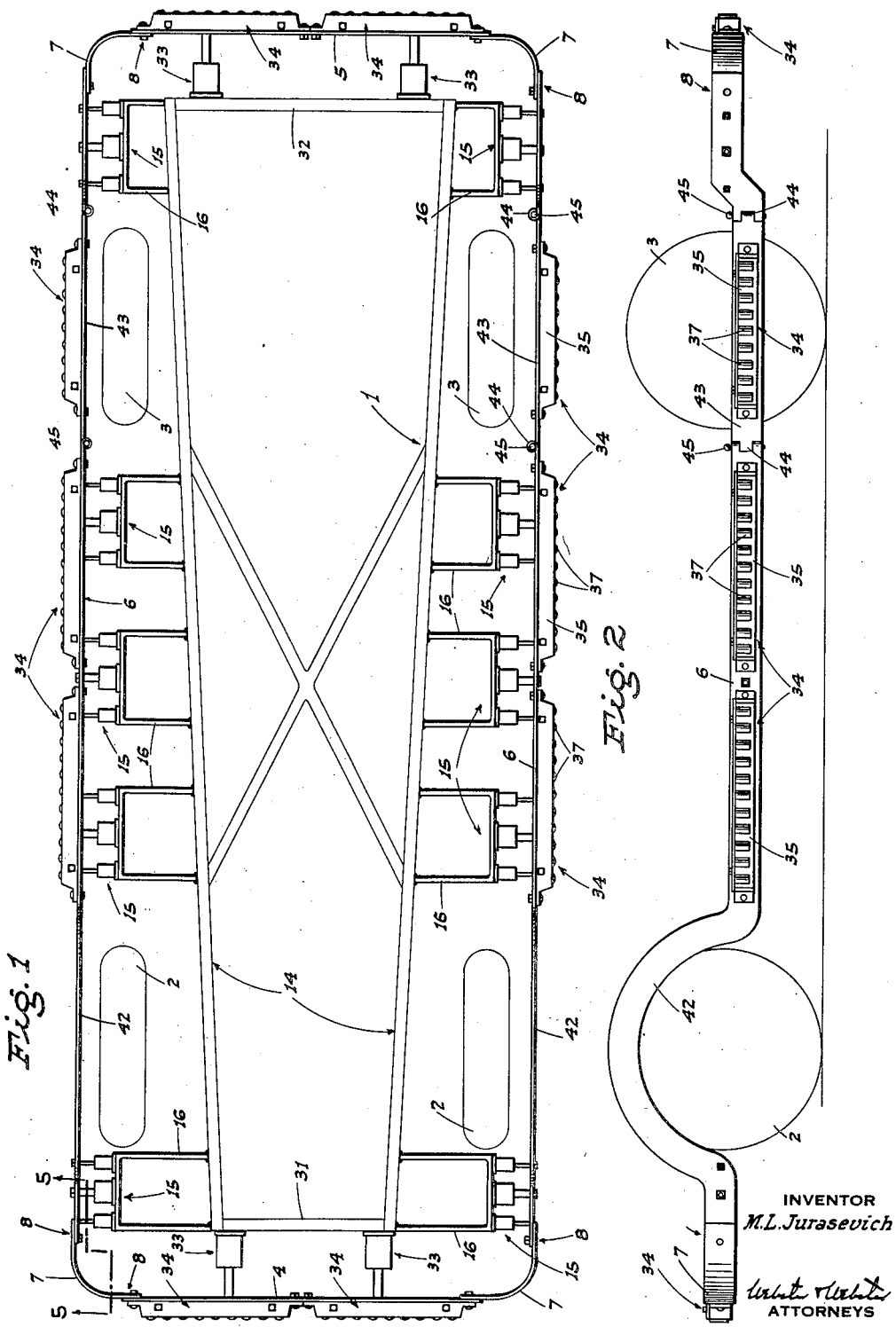
INVENTOR
M. L. Jurasevich
ATTORNEYS Feb. 13, 1951　　　M. L. JURASEVICH　　　2,541,364
VEHICLE BUMPER
Filed June 14, 1948　　　　　　　　　　　　2 Sheets-Sheet 2
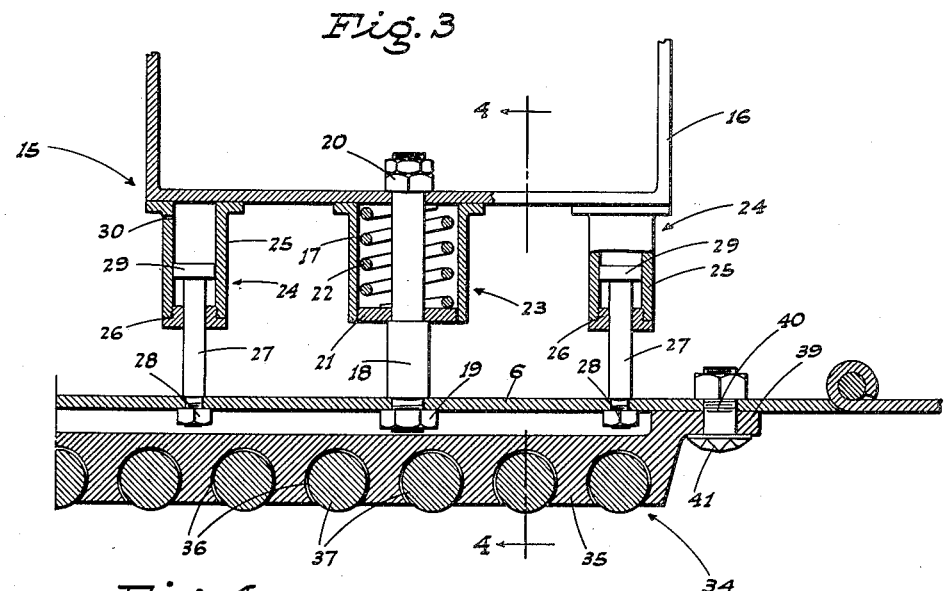
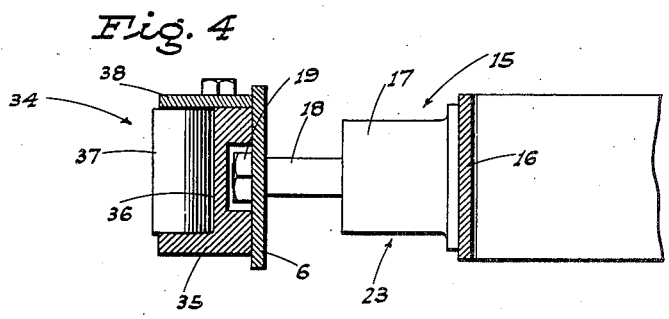
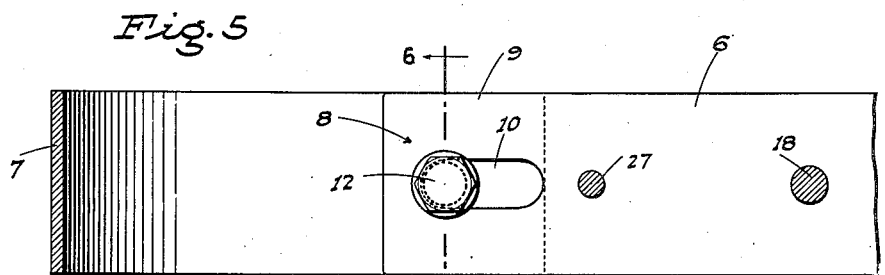
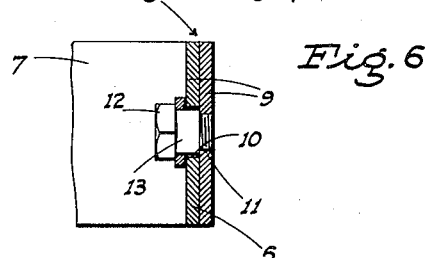
INVENTOR.
M. L. Jurasevich
BY Patented Feb. 13, 1951

2,541,364

UNITED STATES PATENT OFFICE 2,541,364

VEHICLE BUMPER

Mitchell L. Jurasevich, Alturas, Calif., assignor to Elsie Myrtle Jurasevich, Alturas, Calif.

Application June 14, 1948, Serial No. 32,857

1 Claim. (Cl. 293—62)

This invention relates to, and it is an object to provide, a novel vehicle bumper, especially for passenger automobiles but not limited to this use.

Another object of the invention is to provide a vehicle bumper designed to receive the impact, and absorb the shock, of a collision regardless of the direction of travel of either vehicle involved in an accident.

A further object of the invention is to provide a vehicle bumper, as in the preceding paragraph, wherein the bumper comprises, in novel assembly, a continuous bumper structure extending entirely about the vehicle; this continuous bumper structure being sectional with slip-joint units between certain of the adjacent sections whereby to permit the individual sections to receive an impact without effect on the others.

An additional object of the invention is to provide a bumper structure, as above, wherein the sections of the continuous bumper structure are mounted in connection with the vehicle frame by novel cushion or shock absorber units, whereby the shock of a collision is mainly absorbed and not transmitted to the frame and vehicle proper.

It is also an object of the invention to provide a vehicle bumper wherein the continuous bumper structure includes, exteriorly thereon, novel roller units intended to deflect or fend off glancing or diagonal blows in a collision, whereby to minimize the effect of the collision.

A further object of the invention is to provide a practical, rugged, and reliable bumper, and yet one which will be exceedingly effective for the purpose for which it is designed.

These objects are accomplished by means of such structure and relative arrangement of parts as will fully appear by a perusal of the following specification and claim.

In the drawings:

Fig. 1 is a diagrammatic plan view of the vehicle bumper as mounted on a wheel-supported vehicle frame; the latter being shown diagrammatically.

Fig. 2 is a side elevation of the vehicle bumper.

Fig. 3 is an enlarged, fragmentary sectional plan showing one of the shock absorber units and the adjacent roller unit.

Fig. 4 is a cross section on line 4—4 of Fig. 3.

Fig. 5 is a cross section on line 5—5 of Fig. 1.

Fig. 6 is a cross section on line 6—6 of Fig. 5.

Referring now more particularly to the characters of reference on the drawings, the improved vehicle bumper is here shown as mounted in connection with the frame 1 of a motor vehicle, which frame is supported by front wheels 2 and rear wheels 3.

The bumper, which is a continuous structure, extends about the vehicle in above ground relation, and comprises a transverse front section 4, a transverse rear section 5, and longitudinal side sections 6. The bumper sections 4, 5, and 6 are of resilient or spring steel, being of substantial width, as shown. Adjacent ends of the transverse sections 4 and 5, and side sections 6, are connected together by corner sections, each of which is indicated at 7.

The corner sections 7 are generally L-shaped but rounded intermediate their ends, and the lapping end portions of said corner sections 7 are connected to the adjacent ends of the sections 4, 5, or 6 by means of slip joint units, each of which is indicated generally at 8. One slip joint unit is shown in detail in Figs. 5 and 6 wherein the respective lapping parts are indicated at 9; one of said parts having an elongated longitudinal slot 10 therein, while the other part has a tapped bore 11 in register with the slot. A retention and guide bolt 12 extends through the slot 10, and is threaded into the tapped bore 11; such bolt having an enlarged stem 13 which runs in said slot with an easy fit.

It will be recognized that if the front section 4, rear section 5, or one of the side sections 6 receives the impact of a collision, bowing such section and momentarily reducing its effective length, the corresponding slip joint units 8 at opposite ends of the section come into play. In other words, the momentary reduction of effective length of any one of the sections by reason of an impact thereagainst is not transmitted through the corner sections 7.

The longitudinal side sections 6 are each supported from the adjacent side beam 14 of the vehicle frame 1 by a plurality of longitudinally spaced shock absorbing units, indicated generally at 15. In the present embodiment there are three of these units between the front wheels 2 and rear wheels 3 on each side of the vehicle, with other units ahead and to the rear of the wheels 2 and 3, respectively.

As the shock absorbing units 15 are substantially identical a description of one will suffice for all.

Each shock absorbing unit 15 comprises a generally U-shaped bracket 16 fixed at its open end to the adjacent side beam 14 and thence projects laterally outwardly toward, but terminates short of, the corresponding longitudinal side section 6.

A cylinder 17 is fixed centrally on the outer end of each bracket 16 and projects toward the side section 6, but remains clear of the latter.

A plunger rod 18 is secured to the side sections 6 by a nut 19, and thence extends laterally inwardly and axially through the cylinder 17. The plunger rod 18 passes, slidably, through the outer end of the bracket 16, and at its inner end said rod carries stop nuts 20. A piston 21 is fixed on the plunger rod 18 and runs, in guided relation, in the cylinder 17; there being a heavy duty compression spring 22 between the piston 21 and the outer end of the bracket 16.

The above described arrangement may be termed a spring shock absorber, each of which is indicated generally at 23, for ease of subsequent reference.

Upon the corresponding side section 6 being struck adjacent the shock absorbing unit 15, the plunger rod 18 is urged inwardly, carrying the piston 21 against the compression of spring 22, which acts to absorb a considerable portion of the shock.

To provide a further cushioning effect, each shock absorbing unit 15 includes a pair of pneumatic shock absorbers, each indicated generally at 24, disposed on opposite sides of the spring shock absorber 23. Each of the pneumatic shock absorbers 24 comprises a cylinder 25 projecting from the bracket 16, and having a head 26. A plunger rod 27 is fixed to the side section 6 by a nut 28, and thence extends laterally inwardly axially into the cylinder 25 and in slidable relation through its head 26. Within the cylinder 25 the plunger rod 27 carries a piston 29 and the cylinder 25 is formed with a small bleed port 30 adjacent the bracket 16. Thus, upon a collision impact against the side section 6 adjacent any given one of the shock absorbing units 15, the pneumatic shock absorbers 24, functioning as cushion dashpots, act to supplement the shock absorbing action of the corresponding spring shock absorber 23.

The transverse front section 4 and the transverse rear section 5 are mounted in connection with the front cross beam 31 and rear cross beam 32, respectively, of the vehicle frame 1 by means of transversely spaced individual shock absorbers, indicated generally at 33. The shock absorbers 33 are constructed in substantially the same manner as each of the above described spring shock absorbers 23.

Exteriorly thereof each of the bumper sections 4, 5, and 6 are fitted with longitudinal roller units, indicated generally at 34, each such unit comprising a longitudinal bar 35. The bar 35 is formed with a plurality of vertical axis roller receiving bores 36 open to the face of the bar, but to an extent less than 180°. Rollers 37 are disposed in the bores 36, being prevented from escape therefrom by a top or hold-down plate 38.

Each longitudinal bar 35 is attached to the corresponding bumper section by laterally inwardly offset end feet 39 secured to the section by bolts 40 whose outer end or head carries a jewel type reflector 41. By offsetting the feet 39 the bar 35 is maintained outwardly of the nuts 19 and 28 and provides in effect a cover strip therefor.

Each of the longitudinal roller units 34 is operative to receive and deflect diagonal or glancing blows, as distinguished from direct or head-on engagement between colliding vehicles. The roller units 34 receive and deflect diagonal or glancing blows which would otherwise subject the vehicle to more serious consequences.

The above described deflection of diagonal or glancing blows is accomplished by reason of the fact that the rollers 37 are exposed on the outer side, serving as an anti-friction and deflection instrumentality.

The longitudinal side sections 6 have an arched part 42 alongside each front wheel 2, whereby to permit of turning of the latter through their full range. Laterally out from the rear wheels 3, each longitudinal side section 6 includes a removable part 43 held in place at its ends by hinge-type connections 44, each of which includes a pull pin 45. If it is necessary to change a tire on, or to remove, a rear wheel 3, the corresponding removable part 43 of the adjacent side section 6 can be easily removed.

The above described continuous bumper structure for vehicles, especially passenger automobiles, assures of maximum safety to the occupants of the vehicle and a minimizing of collision damage. The continuous bumper structure is operative to receive a collision impact either direct or glancing, and to absorb the shock to a great extent, and in the event of diagonal or glancing blows, to deflect the same. As the continuous bumper structure is sectional, it is not only readily installed at the outset, but the sections thereof can be easily and separately detached for repair or replacement.

A feature which should be noted is that the plunger rods 18 and 27, working axially in their respective cylinders, serve as a means to maintain the corresponding section of the bumper structure in proper position or alinement.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A vehicle bumper comprising in combination with the main frame of the vehicle, a steel spring band section disposed in spaced relation from the main frame, brackets projecting from the main frame to points short of the spring band section, plungers bolted through the band and mounted for movement toward and from the brackets, means mounted on the brackets for yieldably resisting movement of the plungers toward the brackets, rigid bars, each rigid bar having inwardly projecting feet fastened to the band, each bar covering a group of the outer ends of the plungers, and a plurality of vertically disposed rollers journaled in each bar.

MITCHELL L. JURASEVICH.

REFERENCES CITED

The following references are of record in the file of this patent:

UNITED STATES PATENTS

| Number | Name | Date |
|---|---|---|
| 1,472,700 | Vickery | Oct. 30, 1923 |
| 1,495,122 | Vickery | May 20, 1924 |
| 1,664,989 | Nickels | Apr. 3, 1928 |
| 1,699,428 | Goodrich | Jan. 15, 1929 |
| 1,783,934 | Banschbach | Dec. 2, 1930 |
| 1,843,902 | Ridge | Feb. 2, 1932 |
| 2,168,908 | Lewis | Aug. 8, 1939 |
| 2,187,952 | Rusche | Jan. 23, 1940 |